US009885241B2

(12) United States Patent
Bakker et al.

(10) Patent No.: US 9,885,241 B2
(45) Date of Patent: Feb. 6, 2018

(54) SCREW TOOL FOR TURBOMACHINE ROTOR BALANCING

(71) Applicant: ROLLS-ROYCE PLC, London (GB)

(72) Inventors: Mattheus Bakker, Nuneaton (GB); Pascal Wilmes, Derby (GB); James Phylip-Jones, Wirral (GB); Adegoke Gbadeyan, Derby (GB)

(73) Assignee: ROLLS-ROYCE plc, London (GB)

( * ) Notice: Subject to any disclaimer, the term of this patent is extended or adjusted under 35 U.S.C. 154(b) by 273 days.

(21) Appl. No.: 14/695,928

(22) Filed: Apr. 24, 2015

(65) Prior Publication Data
US 2015/0337663 A1 Nov. 26, 2015

(30) Foreign Application Priority Data
May 23, 2014 (GB) .................................. 1409242.3

(51) Int. Cl.
*B23P 15/00* (2006.01)
*F01D 5/02* (2006.01)
(Continued)

(52) U.S. Cl.
CPC ............ *F01D 5/027* (2013.01); *B23P 15/006* (2013.01); *B25B 13/481* (2013.01);
(Continued)

(58) Field of Classification Search
None
See application file for complete search history.

(56) References Cited

U.S. PATENT DOCUMENTS 3,126,774 A 3/1964 Carr et al.
3,985,465 A 10/1976 Sheldon et al.
(Continued)

FOREIGN PATENT DOCUMENTS

EP 0968793 A2 * 1/2000 .......... B25B 15/001
FR 2704170 A1 10/1994
(Continued)

OTHER PUBLICATIONS

Oct. 9, 2015 Search Report issued in European Patent Application No. 15 16 5088.
(Continued)

*Primary Examiner* — Dwayne J White
*Assistant Examiner* — Theodore Ribadeneyra
(74) *Attorney, Agent, or Firm* — Oliff PLC

(57) ABSTRACT

A tool and method for inserting an externally threaded object into a threaded receiving hole and removing and externally threaded object from the receiving hole. The tool is provided with an outer body that has a holding portion to hold the externally threaded object during insertion or removal. The holding portion may be a thread that corresponds with the thread of the externally threaded object. The tool also has a tightening body inside the outer body that has an engagement portion for engaging a corresponding engageable portion of the externally threaded body. The tightening body is rotated within the outer body to tighten or loosen the externally threaded body. During insertion or removal, the externally threaded body is securely held by the holding portion of the outer body.

15 Claims, 3 Drawing Sheets

(51) Int. Cl.
  *B25B 23/16* (2006.01)
  *B25B 13/48* (2006.01)
  *B25B 23/10* (2006.01)
  *B25B 23/12* (2006.01)

(52) U.S. Cl.
  CPC .......... *B25B 23/103* (2013.01); *B25B 23/12* (2013.01); *B25B 23/16* (2013.01); *F05D 2260/15* (2013.01); *F05D 2260/30* (2013.01); *Y10T 29/4932* (2015.01); *Y10T 29/49719* (2015.01); *Y10T 29/49723* (2015.01)

(56) References Cited

U.S. PATENT DOCUMENTS

| | | | | |
|---|---|---|---|---|
| 4,064,762 | A * | 12/1977 | Wikner | B25B 27/0078 29/255 |
| 4,842,485 | A * | 6/1989 | Barber | F01D 5/027 411/104 |
| 8,186,955 | B2 * | 5/2012 | Buskirk | F01D 5/027 416/145 |
| 2002/0083799 | A1 * | 7/2002 | Albertson | B25B 23/0035 81/59.1 |
| 2003/0047042 | A1 * | 3/2003 | Mickelson | B25B 13/48 81/459 |
| 2006/0266114 | A1 * | 11/2006 | Pichel | F01D 25/285 73/460 |
| 2008/0217870 | A1 * | 9/2008 | Shibata | B25B 15/001 279/82 |
| 2009/0008886 | A1 * | 1/2009 | Shu | B23B 31/06 279/103 |
| 2009/0255384 | A1 * | 10/2009 | Whitehead | B25B 27/0035 81/459 |
| 2010/0189561 | A1 * | 7/2010 | Vettese | F03D 1/065 416/144 |
| 2012/0282082 | A1 * | 11/2012 | Pichel | F01D 9/065 415/119 |

FOREIGN PATENT DOCUMENTS

| | | |
|---|---|---|
| GB | 1536336 A | 12/1978 |
| JP | H03208566 A | 9/1991 |
| JP | 2003265492 A | 9/2003 |

OTHER PUBLICATIONS

Oct. 15, 2014 Search Report issued in British Application No. GB1409242.3.

* cited by examiner

SCREW TOOL FOR TURBOMACHINE ROTOR BALANCING

CROSS-REFERENCE TO RELATED APPLICATIONS

This application is based upon and claims the benefit of priority from British Patent Application Number 1409242.3 filed 23 May 2014, the entire contents of which are incorporated by reference.

BACKGROUND

1. Field of the Disclosure

The present disclosure relates to a tool for inserting a threaded object into a corresponding threaded receiving hole. Aspects of the present disclosure relate to a tool for inserting a threaded balancing weight into a rotating machine, such as a rotating disc of a gas turbine engine.

2. Description of the Related Art

The present disclosure relates to a tool for inserting a threaded object into a corresponding threaded receiving hole. Aspects of the present disclosure relate to a tool for inserting a threaded balancing weight into a rotating machine, such as a rotating disc of a gas turbine engine.

The rotor discs of compressors and turbines of gas turbine engines rotate at very high speed in use. It is important for the rotating components, including the discs, to be properly balanced, because any imbalance may result in unwanted movement of the rotating components, for example due to bending of a shaft about which the rotating components rotate. This may result in unwanted contact between rotating and stationary parts and/or an increase in the required tolerance gap between rotating and stationary parts, such as between rotating blades and surrounding cases. In turn, this may result in efficiency losses and/or vibrations, which may lead to damage, for example to bearings.

Accordingly, rotating discs of gas turbine engines need to be precisely balanced during manufacture and assembly. The discs may be balanced firstly during manufacture of the discs themselves, for example by removing material in a conventional manner. The discs may then be precision balanced again after assembly with other rotating components, such as blades that are attached to the disc. It may also be necessary to re-balance rotating components, such as discs, during service of the engine.

Once the engine has been fully assembled, with cases surrounding the various rotating components, access to the rotating components (such as discs) is extremely limited, and so precision balancing is difficult. It would be desirable to be able to insert a balancing screw into a rotor disc after assembly of the engine. However, accurately and reliably positioning such a balancing screw into a rotor disc, through the inner and outer cases for example, is difficult. For example, if a balancing screw were to be simply dropped through a tube that passes through the inner and outer casings for insertion or removal, then its fall through the tube may be uncontrolled, and it may be lost into the engine and/or its position may not be reliable.

OBJECTS AND SUMMARY

Accordingly, it is desirable to be able to balance a rotor disc in an assembled engine in a reliable, repeatable and controlled manner that is straightforward for an operator to implement.

According to an aspect, there is provided a tool (which may be referred to as an insertion tool) for inserting an externally threaded body into a threaded receiving hole. The tool comprises an outer body having a through hole extending along a longitudinal axis, and a holding portion for holding the externally threaded body at a first end (which may be referred to as a distal end) of the through hole. The tool comprises a tightening body (which in any arrangement described or claimed herein may be an elongate tightening body) extending through the through hole and having an engagement portion formed at an end that corresponds to the first end of the through hole. The engagement portion is for engaging a corresponding engageable portion of the externally threaded body. The tightening body is rotatable relative to the outer body about the longitudinal axis.

Accordingly, the tool allows an externally threaded body (which may be a screw, such as a grub screw or balancing screw) to be inserted into and/or removed from a threaded hole in a reliable, controlled manner. The externally threaded body may be securely held by the outer body, reducing the possibility of it becoming lost, dropped, or otherwise out of control when being inserted and/or removed from the threaded hole. This may be particularly (but not exclusively) beneficial where the threaded receiving hole is remote and/or difficult to access, for example where the first end of the through hole and/or the receiving hole is remote from an access hole for the tool.

The holding portion may be said to be arranged to hold the externally threaded body such that it is retained in position within the outer body, for example so that it remains in the same position (or does not move) under the action of gravity. For example, the holding portion may be said to hold (or at least be capable of holding) the externally threaded body so as to retain it (for example relative to the outer body and/or the tool) at least in the direction of the longitudinal axis. The tightening body may be said to be used to translate the externally threaded body along the longitudinal axis, for example relative to the outer body.

The externally threaded body may be a balancing screw. The threaded receiving hole may be provided in a rotatable component, for example a rotatable component of a gas turbine engine which may, for example, comprise a rotor disc. One or more externally threaded bodies may be inserted into one or more threaded receiving holes in a rotatable component using the tool described above and elsewhere herein in order to balance the rotatable component.

According to an aspect, there is provided a balancing kit for balancing a rotatable part. The balancing kit may comprise a tool (or insertion tool) as described and/or claimed herein. The balancing kit may further comprise a balancing screw, which is an externally threaded body that is insertable into the threaded receiving hole. The threaded receiving hole may be provided in the rotatable part to be balanced. The balancing kit may comprise more than one balancing screw. A rotatable part which is to be balanced by the balancing kit may comprise more than one threaded receiving hole. The threaded receiving holes may be provided at different circumferential (or angular) positions around the rotatable component. The threaded receiving holes may be provided on the circumference of the rotatable component. A balancing screw may be inserted into one or more threaded receiving holes in the rotatable part.

According to an aspect, there is provided a method of balancing a rotatable part using the balancing kit described and/or claimed above and elsewhere herein. The method may comprise inserting and/or removing one or more of the balancing screws into one or more corresponding threaded receiving holes provided in the rotatable part.

According to an aspect, there is provided a method of balancing a rotatable part comprising holding a balancing screw having an external thread in a holding portion of an outer body of an insertion tool, the holding portion being positioned at a first end of the outer body. The method comprises tightening or loosening the balancing screw by: engaging an engageable portion of the balancing screw with an engaging portion of a tightening body of the insertion tool, the tightening body extending through a through hole in the outer body; and rotating the tightening body relative to the outer body so as to tighten or loosen the balancing screw in a threaded hole in the rotatable part.

According to an aspect, there is provided a rotating part (for example a rotating disc of a gas turbine engine) that has been balanced using the tools and/or methods described and/or claimed herein.

The tools and methods of the present disclosure may allow repeatable and controlled balancing of a rotatable part, for example a rotatable part that is difficult to access. Balancing screws may be provided to the rotatable part with minimal risk of the balancing screws become detached from the tool and/or lost in any way.

Tightening the balancing screw may result in the balancing screw being inserted into the threaded hole. Loosening the balancing screw may result in the balancing screw being removed from the threaded hole.

The method may comprise inserting or removing at least two balancing screws from corresponding threaded holes provided at circumferentially different positions on the rotatable part.

The method may comprise selecting a desired mass of balancing screw to insert into a threaded hole.

The longitudinal axis of the threaded hole (and thus the longitudinal axis of a balancing screw when inserted into the threaded hole) may extend in a substantially radial direction of the rotatable part. The method of balancing the rotatable part may comprise adjusting the position of the balancing screw within the threaded hole, for example by partially unscrewing the balancing screw within the threaded hole. If the longitudinal axis of the threaded component has a radial component with respect to the rotatable part, then partially unscrewing the balancing screw will affect the moment of inertia about the rotating axis of the rotatable component.

The rotatable part may be or may comprise a rotatable disc of a gas turbine engine, such as a compressor or a turbine disc, to which blades may be attached. The one or more threaded holes may be provided in such a rotatable disc. The methods and/or tools of the present disclosure may allow balancing of such a rotatable part in situ in a gas turbine engine. Providing a reliable manner for balancing a rotatable disc of a gas turbine engine in-situ (i.e. whilst substantially assembled) may be particularly beneficial, for example because losing/dropping a balancing screw into the engine may result in the need for the engine to be stripped and re-built. This may be both time consuming and expensive, because it may require the engine to be out of service for longer than would otherwise be the case.

Where the rotatable part is a disc of a gas turbine engine, it may be provided within at least one casing of the gas turbine engine. The insertion tool may then be inserted through the at least one casing (for example in a hole provided therein) in order to tighten or loosen the balancing screw.

Such a disc of a gas turbine engine may be provided within a radially inner casing and a radially outer casing.

Each casing may have a hole (for example an inspection hole) provided therein. In such an arrangement, the method may comprise aligning the inspection holes in the radially inner and outer casings with the threaded hole in the disc (for example by manually rotating the disc to the desired position). The method may comprise inserting the insertion tool through both the radially inner and outer casings (for example through the inspection holes) in order to tighten or loosen the balancing screw.

The holding portion of the outer body may be an internal thread arranged to engage with the external thread of the externally threaded body. This may be a particularly secure arrangement for ensuring that the externally threaded body is held by the outer body of the tool.

Additionally or alternatively, other holding portion arrangements may be provided. For example, the holding portion may be magnetic.

The engagement portion of the tightening body may be a key shape. This may be particularly effective for transferring torque from the tightening body to the externally threaded body.

The key shape may be, for example, a hexagonal shape, for example in the form of what is commonly referred to as an Allen key or hex key. Alternatively, any desired key shape could be used such as, by way of non-limitative example, a square key, a Torx key, a flat screw driver or a Philips screwdriver.

Where the engagement portion has a key shape, the key shape may be confined to the engagement portion, and the rest of the tightening body may have a different cross section (for example circular). Alternatively, the tightening body may have a uniform cross-sectional shape along its length that corresponds to the key shape of the engagement portion.

In use, the tightening body may provide torque to the externally threaded body. This may allow the externally threaded body to be tightened and/or loosened. The end of the tightening body opposite to the engagement portion (for example at the opposite end of an elongate tightening body relative to its longitudinal axis) may be provided with a driving element through which a torque may be applied to rotate the tightening body. This torque may be passed to the externally threaded body via the engagement portion.

The driving element may be, for example, a socket. The socket may be a conventional socket and may be engageable with a lever, such as a ratchet. Alternatively, any other suitable driving element may be provided, for example a handle and/or a wrench, such as a torque wrench.

The tightening body of the tool may be removable from the outer body. As such, the tool may be a two-part tool. Alternatively, the tightening body and the outer body may be secured together, whilst being rotatable relative to each other. The tightening body and the outer body may also be said to be translatable relative to each other, for example along a longitudinal axis. As the balancing screw is inserted or removed, the tightening body may move within the outer body, for example as the balancing screw is rotated.

The holding portion may be provided with a handle at a second end, which may be referred to as a proximal end and may be opposite to the first end. The handle may allow the holding portion of the tool to be held, for example to allow the tool (and thus the externally threaded body) to be placed in the desired position and/or during rotation of the tightening body.

The threaded receiving hole into which the externally threaded body is located may be an insert, for example an insert in a rotatable body to be balanced. The threaded receiving hole (for example in the form of an insert) may be, for example, provided in a circumferential groove of a disc of a gas turbine engine into which blades (for example compressor or turbine rotor blades) are located.

Embodiments of the invention will now be described by way of non-limitative example with reference to the accompanying drawings in which:

DETAILED DESCRIPTION OF EMBODIMENTS

Figure 1:
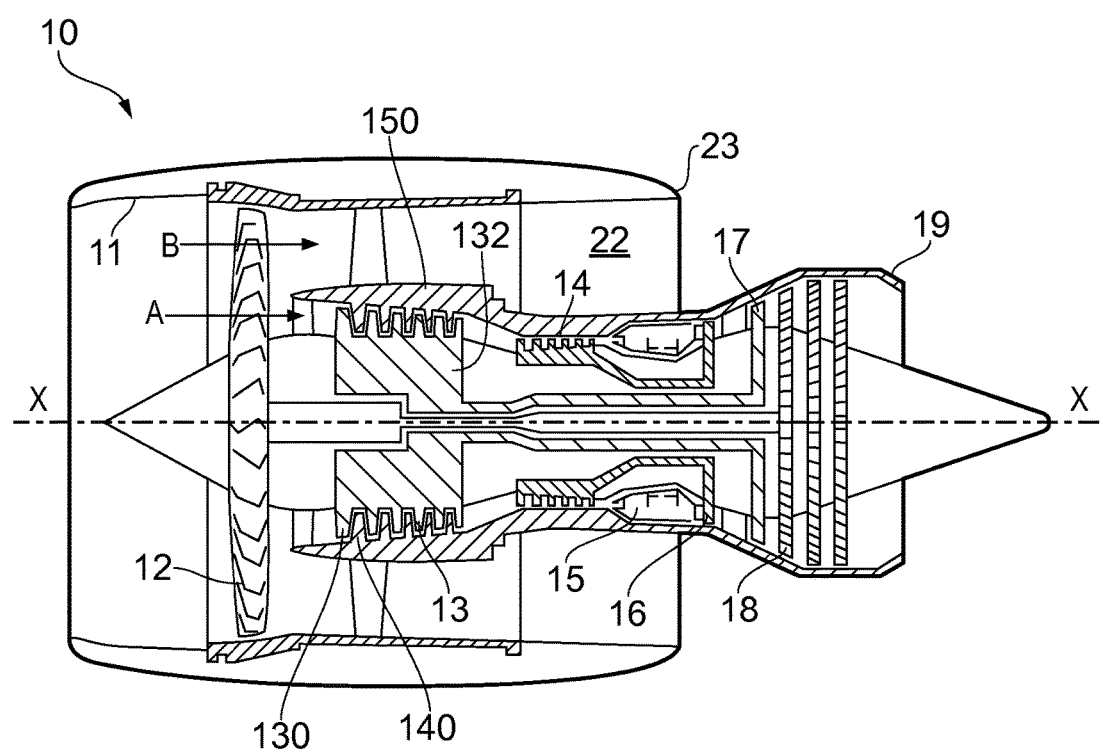
FIG. 1 shows a cross-section through a gas turbine engine.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Each of the high, intermediate and low-pressure turbines 16, 17, 18 and the intermediate and high-pressure compressors 13, 14 comprises at least one stage comprising a set of rotor blades and a set of stator vanes. In use, the rotor blades rotate around the engine axis X-X, whilst the stator vanes are stationary within the engine. Purely by way of example, in FIG. 1, the rotor blades of the intermediate pressure compressor 13 are given the reference numeral 130, and the stator vanes are given the reference numeral 140.

A rotor disc 132 may have one or more sets of rotor blades 130 attached thereto, from one or more stages. The rotor blades 130 may be attached to the rotor disc in any suitable manner, for example by manufacturing slots in the disc 132 into which the blades 130 are inserted, or by permanently joining the blades 130 to the disc 132 (for example by welding, for example linear friction welding or inertia welding), or by forming the disc 132 and the blades 130 from a single metal sheet.

The rotor blades 130 and the rotor disc 132 of any stage of the compressor or turbine rotate together at high rotational speed in use of the gas turbine engine 10. Accordingly, it is important to be able to precision balance the rotating parts of the gas turbine engine 10, such as the combined rotor disc 132 and rotor blades 130, for at least the reasons described elsewhere herein. In particular, it is necessary to be able to precision balance the rotating parts when they are in-situ in the engine.

Figure 2:
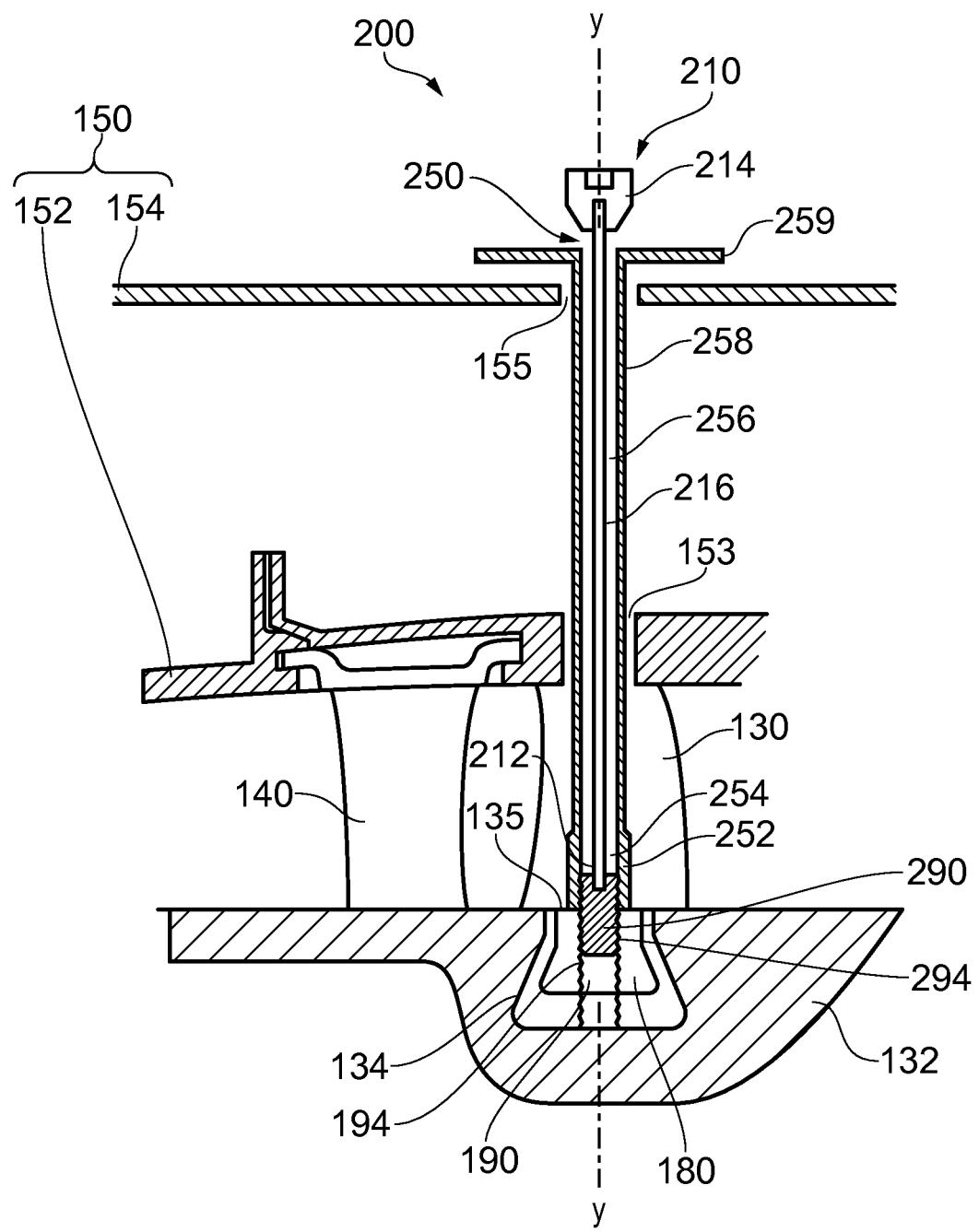
FIG. 2 shows a tool according to an example of the disclosure being used to balance a rotor disc.

In FIG. 1, the rotor blades are shown as being radially inside an engine core casing 150. The engine core casing 150 is shown schematically in FIG. 1. In FIG. 2, the casing 150 is shown by way of example as comprising an inner casing 152 and an outer casing 154, the terms inner and outer referring to their relative radial positions. The stator vanes 140 may extend from the inner core casing 152, as in the FIG. 2 example.

The rotating parts may be balanced in situ by inserting and/or removing one or more balancing screws 290 (which may be considered to be examples of grub screws or set screws). FIG. 2 shows an example of a balancing screw 290 being inserted or removed from a receiving hole 190 in the rotor disc 132 (having rotor blades 130 attached). The receiving hole 190 may be a threaded receiving hole 190 and/or may be formed in an insert 180 located in a slot (which may be a circumferentially extending slot) 134 formed in the rotor disc 132. During assembly of the gas turbine engine 10, the rotor blades (more precisely a root portion of each rotor blade 130) may be slotted into the slots in the rotor disc 132 in order to secure the rotor blades 130 to the disc 132. The receiving hole 190 may be formed directly in the rotatable part 132, rather than in an insert 180. Where the receiving hole 190 is formed in an insert 180, the insert 180 may be considered to be a part of (for example an integral part of) the rotatable part 132.

The or each receiving hole 190 may be accessible from outside the casing 150 (for example from outside an inner casing 152 and an outer casing 154) through one or more inspection holes 153, 155 formed in the inner and outer casings 152, 154. The inspection holes 153, 155 may be used for other purposes, for example for inserting a boroscope or other inspection into the engine core to inspect the core of the engine 10, for example during service or maintenance. An access hole 135 may also be provided in (or between) platforms of the rotor blades 130 in order to access a respective receiving hole 190.

In order to insert or remove a balancing screw 290 into a respective receiving hole 190, a tool 200 is used. Such a tool 200 is shown by way of example in FIGS. 2 and 3. The tool 200 comprises an outer body 250 and a tightening body (which may be an elongate tightening body) 210. The tightening body 210 is placed within a through hole 256 in the outer body 250. The through hole 256 may be said to be defined by a tube portion 258 of the outer body 250. The tightening body 210 is rotatable relative to the outer body 250 about their common longitudinal axes Y-Y.

The outer body 250 has a holding portion 252 provided at a first end. The holding portion 252 (which may be referred to as a "screw catcher") holds the balancing screw 290 during at least a part of its insertion into or removal from the receiving hole 190. The holding portion 252 may be arranged to hold the balancing screw 290 in any suitable manner. For example, the holding portion 252 may have an internal thread 254 that engages with an external thread 294 of the balancing screw 290, as in the example shown in FIGS. 2 and 3. As such, such an internal thread 254 of the outer body 250 may be of the same type (for example the same pitch and diameter) as a thread 194 of the receiving hole 190 in the rotatable body 132.

The outer body 250 may also comprise a handle 259, as shown by way of example in the FIG. 2 arrangement. The handle 259 may be provided at a second end and/or may be used to control the position of the outer body 250 and/or to hold it stationary whilst the tightening body 210 is rotated within the through hole 256.

Figure 3:
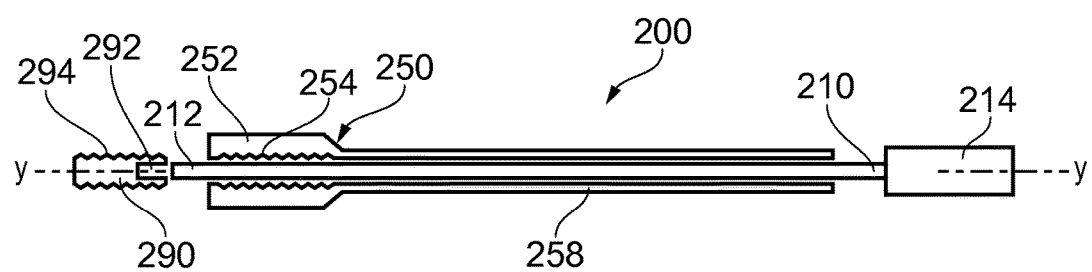
FIG. 3 shows a tool according to an example of the present disclosure.

The tightening body 210 is provided with an engagement portion 212. In use, the engagement portion 212 is used to drive a corresponding engageable portion 292 of the balancing screw 212 in order to transfer a tightening or loosening torque from the tightening body 210 to the balancing screw 290. The engagement portion 212 may take any suitable form, as described by way of example elsewhere herein. In the example of FIGS. 2 and 3, for example, the engagement portion 212 may have a hexagonal cross-section, and thus may be referred to as a hex-drive or an Allen key shape.

The tightening body 210 may be provided with a driving element or driving portion 214. Such a driving portion 214 may be provided at the opposite end of the tightening body 210 to the engagement portion 212 (with respect to the longitudinal axis Y-Y). The driving element 214 may take any suitable form, such as that of a conventional socket drive. Such a driving element 214 may be formed as part of the tightening body 210, and thus may be a part of the tool 200. Alternatively, a driving element may be provided as a separate part (for example a conventional socket) to be used with the tool 200.

The tightening body 210 may be comprise a shaft 216 that joins (for example rigidly connects) the engagement portion 212 to a driving element 214 (where the driving element is present), as in the arrangement of FIGS. 2 and 3. Such a shaft 216 may be said to extend along the longitudinal axis Y-Y of the tightening body 210.

In use, the tool 200 may be used to tighten (for example insert) and/or loosen (for example remove) one or more balancing screws 290 into corresponding receiving holes 190 in order to balance the rotor 132 in situ.

In order to insert a balancing screw 290, the balancing screw 290 may firstly be placed into the holding portion 252 of the outer body 250 so as to be securely held therein. With the access holes 155, 153, 135 aligned to provide access to the receiving hole 190, the tool 200 (or at least the outer body 250 thereof) may then be inserted through the casing(s) 150 so as to bring the balancing screw 290 and the receiving hole 190 together. The engagement portion 212 of the tightening body 210 may then be engaged with the engageable portion 292 of the balancing screw 290. Optionally, the tightening body 210 and the outer body 250 may be separable from each other, in which case the tightening body may be inserted into the through hole 256 in order to bring the engagement portion 212 into engagement with the engageable portion 292 of the balancing screw 290. The tightening body 210 may then be rotated relative to the outer body 250 in a direction that causes the balancing screw 290 to be driven into (or tightened into) the receiving hole 190.

The procedure for removal (or loosening) of a balancing screw 290 may be substantially the opposite to the procedure for inserting (or tightening) the balancing screw 290. Accordingly, the engagement portion 212 may be engaged with the engageable portion 292 of the balancing screw 290, and then the tightening body 210 may be rotated relative to the outer body 250 in a direction that causes the balancing screw 290 to be drawn out of (or loosened from) the receiving hole 190. As the balancing screw 290 is removed from the receiving hole 190, it is drawn into the holding portion 252 of the outer body 250. Once the balancing screw 290 is completely removed from the receiving hole 190, it may be removed out from the core engine, through the casing(s) 150, whilst being securely retained by the holding portion 252.

Accordingly, a balancing screw may be safely, securely, and repeatably inserted or removed using the tool 200.

In order to balance the rotor disc 132/blades 130, a balancing kit may be provided that comprises at least one balancing screw 290 and the balancing tool 200. The rotor disc 132 may be provided with more than one receiving hole 190 at different circumferential positions. Balancing screws may then be inserted or removed into the different receiving holes 190 as required in order to balance the disc 132 using the tool 200 and method described and/or claimed herein.

Whilst aspects of the disclosure relate to providing one or more balancing screws 290 to a rotor disc 132 in order to balance the rotor disc 132, it will be appreciated that the tools and/or methods could be used to insert or remove any externally threaded body (such as a set screw or grub screw) to/from a threaded receiving holes. Where the disclosure relates to with the exemplary arrangements/methods described above, many equivalent modifications and variations will be apparent to those skilled in the art when given this disclosure. Accordingly, the exemplary arrangements/methods set forth above are considered to be illustrative and not limiting. Various changes to the described arrangements/methods may be made without departing from the scope of the invention.

Where reference is made herein to a gas turbine engine, it will be appreciated that this term may include may be any type of gas turbine engine, including, but not limited to, a turbofan (bypass) gas turbine engine, turbojet, turboprop, ramjet, scramjet or open rotor gas turbine engine, and for any application, for example aircraft, industrial, and marine application. Aspects of the disclosure may be applicable, for example, to any turbomachinery. Any feature described and/or claimed herein may be combined with any other compatible feature described in relation to the same or another embodiment.

We claim:

1. A balancing kit to balance a rotatable part comprising:
   a tool to insert an externally threaded body into a threaded receiving hole, the threaded receiving hole being provided in the rotatable part to be balanced, the tool including:
      an outer body having a through hole extending along a longitudinal axis, and a holding portion configured to hold the externally threaded body at a first end of the through hole, the holding portion of the outer body including an internal thread arranged to engage with an external thread of the externally threaded body; and
      a tightening body extending through the through hole and having an engagement portion formed at an end of the tightening body corresponding to the first end of the through hole, the engagement portion engaging a corresponding engageable portion of the externally threaded body, the tightening body being rotatable relative to the outer body about the longitudinal axis; and
   a balancing screw that is the externally threaded body insertable into the threaded receiving hole.

2. The balancing kit according to claim 1, wherein the holding portion is magnetic.

3. The balancing kit according to claim 1, wherein the engagement portion of the tightening body is a key shape.

4. The balancing kit according to claim 3, wherein the key shape is a hexagonal shape.

5. The balancing kit according to claim 3, wherein the tightening body has a uniform cross-sectional shape along a length of the tightening body corresponding to the key shape of the engagement portion.

6. The balancing kit according to claim 1, wherein an end of the tightening body opposite to the engagement portion is provided with a driving element through which a torque is applied to rotate the tightening body.

7. The balancing kit according to claim 6, wherein the driving element is a socket tool.

8. The balancing kit according to claim 1, wherein the tightening body is removable from the outer body.

9. A method of balancing a rotatable part using the balancing kit according to claim 1, comprising inserting and/or removing one or more of the balancing screws into one or more corresponding threaded receiving holes provided in the rotatable part using the tool.

10. A method of balancing a rotatable part comprising:
holding a balancing screw having an external thread in a holding portion of an outer body of an insertion tool, the holding portion being positioned at a first end of the outer body and including an internal thread arranged to engage with the external thread of the balancing screw; and
tightening or loosening the balancing screw by (i) engaging an engageable portion of the balancing screw with an engaging portion of a tightening body of the insertion tool, the tightening body extending through a through hole in the outer body, and (ii) rotating the tightening body relative to the outer body to tighten or loosen the balancing screw in a threaded hole in the rotatable part.

11. The method of balancing a rotatable part according to claim 10, further comprising inserting or removing at least two balancing screws from corresponding threaded holes provided at circumferentially different positions on the rotatable part.

12. The method of balancing a rotatable part according to claim 10, wherein the rotatable part comprises a rotatable disc, which is in at least one casing of a gas turbine engine and has the one or more threaded holes provided within, the method further comprising:
inserting the insertion tool through the at least one casing in order to tighten or loosen the balancing screw.

13. The method of balancing a rotatable part according to claim 12, wherein the rotatable disc is provided within a radially inner casing and a radially outer casing, each having a hole provided therein, the method further comprising:
aligning the holes in the radially inner and outer casings with the threaded hole in the rotatable disc; and
inserting the insertion tool through both the radially inner and outer casings to tighten or loosen the balancing screw.

14. A rotor disc of a gas turbine engine balanced using the balancing kit of claim 1.

15. A rotor disc of a gas turbine engine balanced using the method of claim 9.

* * * * *